United States Patent

[11] 3,595,976

| [72] | Inventors | Manfred Wahlster<br>Bochum-Stiepel;<br>Alok Choudhury, Hattingen, both of,<br>Germany |
|---|---|---|
| [21] | Appl. No | 14,594 |
| [22] | Filed | Feb. 26, 1970 |
| [45] | Patented | July 27, 1971 |
| [73] | Assignee | Rheinstahl Huttenwerke Ag.<br>Essen, Germany |
| [32] | Priority | Feb. 27, 1969, Feb. 27, 1969 |
| [33] | | Germany |
| [31] | | G 69 07 777 and P 19 09 866.9 |

[54] METHOD AND APPARATUS FOR ELECTROSLAG REMELTING
11 Claims, 6 Drawing Figs.

[52] U.S. Cl. .................................................. 13/12, 13/14
[51] Int. Cl. .................................................. H05b 3/60
[50] Field of Search .................................... 13/9, 12, 14, 15, 16

[56] References Cited
UNITED STATES PATENTS
1,113,778  10/1914  Gray ............................. 13/12 X
FOREIGN PATENTS
979,583  1/1965  Great Britain ................ 13/9 ES Primary Examiner—Bernard A. Gilheany
Assistant Examiner—R. N. Envall, Jr.
Attorney—McGlew and Toren ABSTRACT: In a method and apparatus for electroslag remelting ingots, using plural electrodes connected to a source of polyphase alternating current, a first set of $n$ electrodes are connected to a source of polyphase AC potential to provide a voltage vector rotating in a selected angular direction, and a second set of $n$ electrodes are connected to a source of polyphase AC potential to provide a voltage vector rotating in an angular direction opposite to such selected direction. The first and second electrodes are positioned in a mold with each electrode of one set located between a pair of electrodes of the other set, and the electrodes are energized to effect the electroslag remelting operation. Preferably the electrodes of the two sets are arranged in alternation on a common circle. Novel bus bar and clap means are facilitating adjustment and replacement of electrodes. More than two sets of electrodes may be used, provided the number of electrodes in each set is equal to the number of electrodes in each other set. Preferably, the electrodes are connected to terminals of a low frequency inverter system furnishing a Y-connected polyphase current, and the junction of the Y-connection is connected to the bottom of the mold.

PATENTED JUL 27 1971 3,595,976

INVENTOR.
MANFRED WAHLSTER
BY ALOK CHOUDHURY

ATTORNEYS

INVENTOR.
MANFRED WAHLSTER
BY ALOK CHOUDHURY

*McGlew & Toren*

ATTORNEYS

METHOD AND APPARATUS FOR ELECTROSLAG REMELTING

BACKGROUND OF THE INVENTION

In electroslag remelting of ingots, high current intensities, of the order of 1,000 amperes, are used. When remelting using single-phase current, this leads to considerable losses in the feed or supply lines and, additionally, to a highly asymmetrical loading of the supply network. The losses in the feed lines are due particularly to the high self-inductance of the circuit formed by the supply and return conductors and which, in single-phase operation, comprise the supply line to the electrode and the discharge through the remelted ingot back to the source of potential.

To avoid this disadvantage, it is known to use three electrodes supplied with polyphase current. With this procedure, the rotating magnetic field of the polyphase current causes a codirectional rotation of the still liquid portion of the remelted ingot. The rotation of the molten slag and of the molten metal about the axis of the remelted ingot promotes heat transfer into the mold and refines the crystal structure of the remelted ingot.

However, it has been found that, using high-alloyed steels, for example stainless steels containing 18 percent chromium and 8 percent nickel, very strong local concentrations of the alloy components occur during electroslag remelting using polyphase current. When very large ingots, for example, those weighing from 100 to 200 tons, are remelted utilizing polyphase current, nonmetallic inclusions occur, especially along the axis of the ingot.

SUMMARY OF THE INVENTION

This invention relates to the electroslag remelting of ingots and, more particularly, to a novel and improved method of an apparatus for effecting such electroslag remelting using polyphase alternating current.

The objective of the present invention is to provide a method for electroslag remelting of ingots, using plural electrodes energized from a source of polyphase current, in which, even when remelting high-alloyed steels, no great local concentration differences occur and, when remelting especially large and heavy ingots, nonmetallic inclusions in and near the ingot axis are reliably avoided.

In accordance with the invention, this problem is solved by providing a first set of three electrodes connected to a source of polyphase alternating current to provide a voltage or magnetic vector rotating in a selected angular direction, and providing at least one additional set of three electrodes, each electrode being positioned between electrodes of the first set, connected to a source of polyphase alternating current to provide a voltage or magnetic vector rotating in an angular direction opposite to such selected direction.

Thus, the magnetic vectors of the rotating fields of the first and second set rotate in respective opposite directions, and their rotational effects on the slag bath and on the liquid metal in the pool of the solidifying ingot cancel each other completely or substantially completely. Surprisingly, it has been found, using this procedure, that local concentrations of alloy components are reliably avoided, as are also, in large ingots, nonmetallic inclusions in the ingot core or axis.

The method can be performed using either two sets each comprising three electrodes or with a multiple of three electrodes, for example by subdividing one or both sets of three electrodes into six electrodes, nine, 12, or the like electrodes. All that is necessary is that the rotational effects of the two groups of electrodes are opposite and equal. This can be attained by maintaining equal total current intensity for the two groups or sets of electrodes.

In a particularly advantageous embodiment of the invention, the electrodes of both sets are arranged on a common circle in alternation. With this symmetrical arrangement, there is attained a complete cancellation of the two opposing rotational effects of the two magnetic fields on the bath, and the highest homogeneity of the ingots produced.

The increase in the number of electrodes used with the invention method to at least six, as compared with the three electrodes hitherto used, is especially effective in remelting large ingots, the head of the ingot to be remelted being heated uniformly due to the more uniform energy supply per unit area. Thereby, a very uniform solidification of the remelted ingot, longitudinally of the ingot, is attained without segregation or other inhomogeneities. When remelting large ingots of a total weight of 100 or 200 tons, for example, the nonmetallic inclusions and segregations can be avoided reliably using the invention method.

Advantageously, the invention method is performed with an apparatus including six electrodes arranged in alternation on a common circle at equal angular spacings, and with the first group of three electrodes being so connected with the terminals of a polyphase current transformer that the vector of the voltages between the three electrodes, of the first group, revolves clockwise as viewed from above, and with the three electrodes of the second group being so connected with the terminals of a polyphase current transformer that the vector of the voltages between the three electrodes of the second group revolves counterclockwise as seen from above. In an especially advantageous embodiment, the apparatus is so designed that the six electrodes are connected with a total of three terminals of a polyphase current transformer, the flexible cables extending from these three terminals being installed close together and connected, just in advance of the mold, to three parallel bus bars. The plane of symmetry through the middle bus bar passes through the center of the electrode circle in such a way that the electrodes, in groups of three, are arranged in mirror symmetry with respect to the plane of symmetry. Shunt bus bars connect the first current bus bar to the first two electrodes symmetric to the plane, connect the central current bar to the next two symmetrically arranged electrodes, and connect the third current bar to the third two symmetrically arranged electrodes. The shunt bus bars are rigidly connected with the current bus bars, and the bus bars are supported or braced relative to each other by means of insulating material, are securely connected with each other and are associated with a lifting and lowering device.

This form of construction of the apparatus is distinguished by a particularly simple and low induction line layout. In addition, all of the electrodes can be moved into the mold by a common lifting and lowering device, and feeding of the electrodes can be adequately effected. This is made possible by the fact that the conductors in the zone of the mold are designed as bus bars which, by their mutual support or bracing with insulating material and their fixed interconnections, form a closed block which, in addition to supplying current to the electrodes, mounts or retains the electrodes. This form of construction of the apparatus is especially suitable for remelting ingots for which frequent changes of electrodes are not necessary.

For very large ingots, the apparatus, which comprises a water-cooled mold having a bottom plate and several electrodes immersed in a slag bath above the ingot in the mold, and connected with the terminals of polyphase alternating current sources, is advantageously designed as will now be mentioned. A total of six electrodes, whose axes are arranged substantially symmetrically to the mold axis on a common circle, are held by individual electrode holders movable in the vertical and radial direction, as well as in the directions normal thereto, and provided with corresponding drives. Each electrode holder includes an electrode-holding clamp associated with an actuator for opening and closing the clamp, and also includes a current supply line. The electrodes form two groups, with the electrodes of the first group being so connected with the terminals of a low frequency inverter system that the voltage vector revolves clockwise as viewed from above. The electrodes of the second group are so connected with the terminals of a low frequency inverter system that the voltage vector revolves counterclockwise as seen from above. The low frequency inverter means furnish a Y-connected polyphase current, with the Y-point electrically connected with the bottom plate of the mold.

This embodiment of the apparatus permits simple, fully automatic changing of the electrodes during operation. For the purpose, the consumed electrode stump is lifted from the electrode holder upwardly out of the mold, swung to the side, and dropped into a waste container by opening the electrode-holding clamp. Then the electrode holder is operated to grip a new electrode in its clamp, being actuated pneumatically, for example, and the electrode holder moves the new electrode into the mold. During the cutoff of current, which is effective through the changing of the electrode for the electrode being changed, the current from the two remaining phases flows through the bottom plate while, during operation with three electrodes, the currents so supplement each other that the current flow through the bottom plate is substantially zero. When changing electrodes, a disturbance of the equilibrium, or of the angular momentum, is inevitable. It is, however, reduced to a minimum duration by the fully automatic changing of electrodes. The new electrode, to be introduced into the mold, is preheated at its lower end, in order not to disturb the heat economy of the process. For example, immersion of a cold electrode would briefly cool the slag locally to too great a degree.

The depth of immersion of the electrodes is controlled by measurement of the current intensities of the individual electrodes. At deeper immersions, the resistance decreases and the current intensity increases while, at lesser immersions, the resistance increases and the current intensity decreases. The control is effected in a manner such that, when a value set on an ammeter decreases, the electrode is lowered a short distance and, when the value set on the ammeter increases, the electrode is lifted a short distance. Control of the lifting motor is effected automatically by contacts separated by the ammeter.

Alternatively, the assigned value of the current intensity may be maintained exactly constant by means of a control DC motor whose speed is regulated as a function of the deviation from an assigned current intensity. Lowering of an electrode is then effected in a continuous manner.

With this embodiment of the invention, it is not possible to place the electric leads close together, due to the inevitable high self-induction losses at line frequency. By lowering the frequency, by means of inverter systems, to approximately 5—15 cycles, the self-induction losses are greatly reduced.

An object of the invention is to provide an improved method of an apparatus for electroslag remelting of ingots. Another object of the invention is to provide such an improved method and apparatus using plural electrodes connected to a source of polyphase alternating current.

A further object of the invention is to provide such a method and apparatus including a first set of n electrodes connected to a source of polyphase AC potential to provide a voltage vector rotating in an selected angular direction, and to provide a second set of n electrodes to a source of polyphase AC potential to provide a voltage vector rotating in an angular direction opposite to such selected direction.

Another object of the invention is to provide such a method and apparatus in which the first and second electrodes are positioned in a mold with each electrode of one set located between a pair of electrodes of the other set.

A further object of the invention is to provide such a method and apparatus in which the electrodes are arranged in alternation on a common circle.

A further object of the invention is to provide such a method and apparatus in which the electrodes are supplied with alternating current at a low frequency through one or more inverter systems.

Another object of the invention is to provide such an apparatus including novel electrode support and feeding means.

For an understanding of the principles of the invention, reference is made to the following description of typical embodiments thereof as illustrated in the accompanying drawings.

DESCRIPTION OF THE PREFERRED EMBODIMENTS

Figure 1:
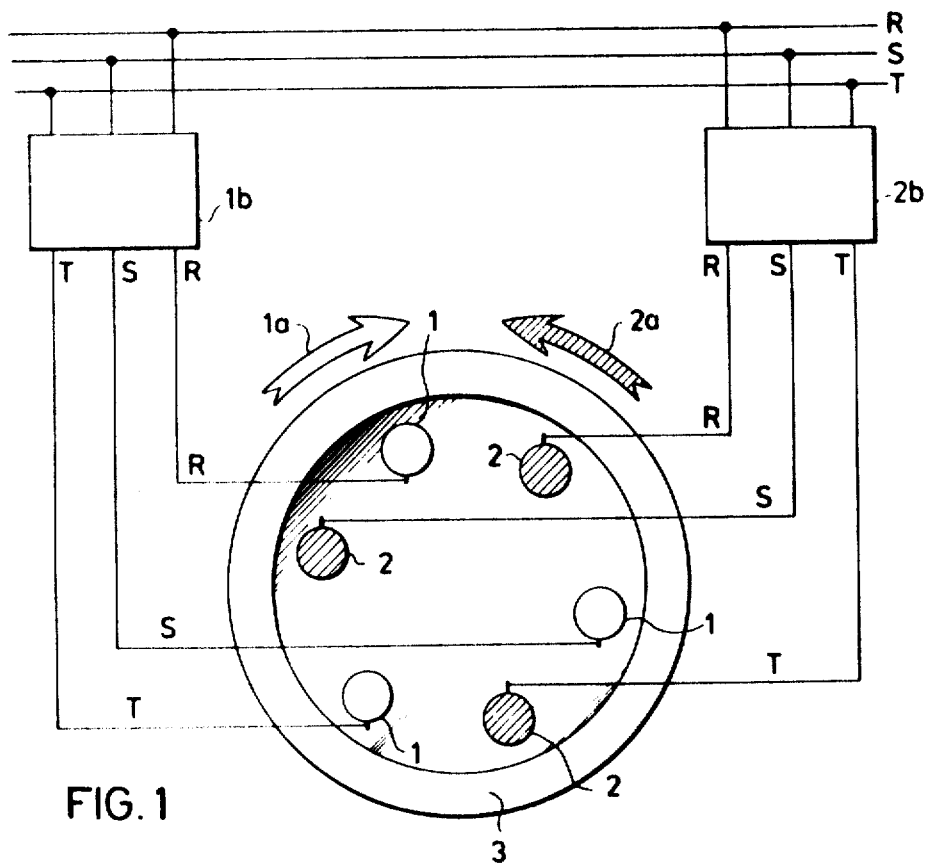
FIG. 1 is a simplified and essentially schematic top view of an apparatus for performing the method of the invention.

In the method of electroslag remelting of ingots, using plural electrodes energized by polyphase current, as schematically illustrated in FIG. 1, a first set of electrodes 1 is supplied with a polyphase current whose vector rotates in the direction indicated by arrow 1a. Another set of three electrodes 2, which are distinguished by shading in FIG. 1, is supplied with polyphase current having an opposite direction of rotation, as indicated by the shaded arrow 2a. The electrodes of the two sets are arranged in alternation on a common circle and at equal angular distances from each other.

In the example illustrated somewhat schematically in FIG. 1, two three-phase transformers 1b and 2b are used, and are connected to the same network. The respective phases of the polyphase current are designated as R, S and T. From the schematically indicated three-phase transformers, current is supplied to the electrodes through conductors R', S' and T', and these conductors are arranged as close to each other as possible. The electrodes dip into a slag bath contained in mold 3 and melt down, under the action of current flowing between the electrodes 1 and 2 the slag and an ingot in mold 2, for the eventual resolidification of the remelted ingot.

Figure 2:
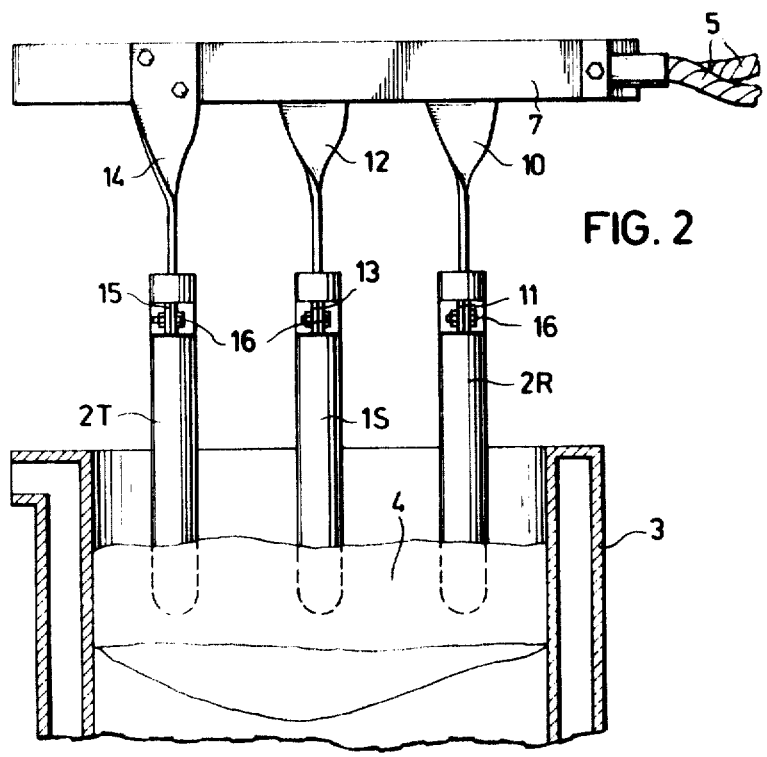
FIG. 2 is a vertical or axial sectional view of one embodiment of apparatus in accordance with the invention.
Figure 3:
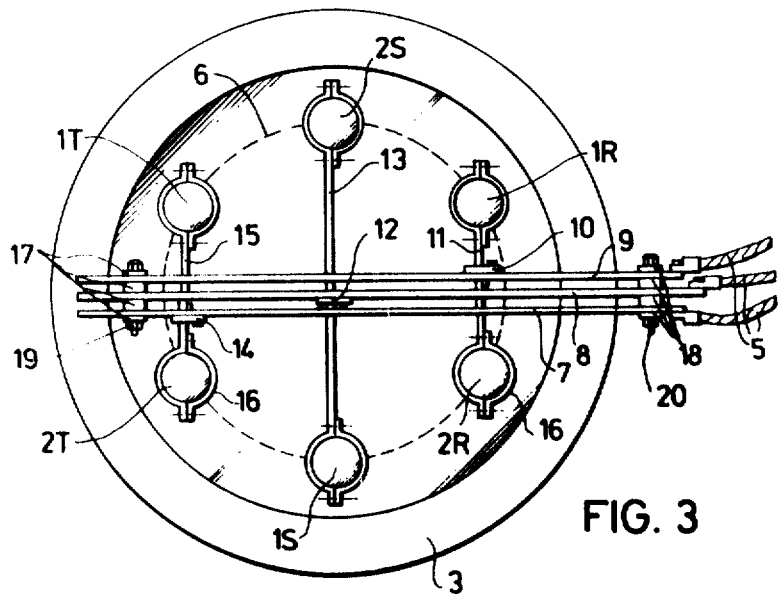
FIG. 3 is a top plan view of the apparatus shown in FIG. 2.

Referring to FIGS. 2 and 3, the embodiment of the apparatus illustrated therein includes a water-cooled mold 3 and electrodes 1 and 2 immersed in a slag bath 4 over the ingot positioned in mold 3. The electrodes are connected, by flexible cables 5, with the terminals of a polyphase current transformer which has not been illustrated. The six electrodes are divided into two groups, and the electrodes of the respective groups are arranged in alternation with each other at equal angular spacings on a common circle 6 indicated in broken lines in FIG. 3. The first group of electrodes 1R, 1S and 1T is connected with the terminals of the polyphase current transformer in a manner such that the vector of the voltages between the three electrodes rotates clockwise as viewed from above. The electrodes of the second group 2R, 2S and 2T are connected with the terminals of the polyphase current transformer in such a manner that the vector of the voltages rotates counterclockwise as viewed from above.

Flexible cables 5, leading from the three terminals of the polyphase current transformer, are arranged close together and connected to three parallel bus bars 7, 8 and 9, just in advance of mold 3. The plane of symmetry through central bus bar 8 passes through the center of circle 6 in a manner such that electrodes arranged in two groups, one including electrodes 1R, 2S and 1T, and the other including 2R, 1S and 2T, are arranged in mirror symmetry relative to the plane of symmetry through central bus bar 8. Each of these shunt bars is in the form of an inverted T, including a downwardly extending stem and a horizontally extending head. A shunt bar comprising a stem 14 and a head 15 connects the first bus bar 7 to the first two electrodes 1T and 2T which are symmetric to the plane. A second shunt bar, including a stem 12 and a head 13, connects central bus bar 8 to the next two symmetrically arranged electrodes 1S and 2S. A third shunt bar, comprising a stem 10 and a head 11 connects the third bus bar 9 to the third symmetrically arranged electrodes 1R and 2R. The lower horizontally extending heads of the inverted T-shaped shunt bars 11,13 and 15 have their ends formed as semicylinders or semicircles embracing the ends of the electrodes, and the electrodes are secured to the bus bar heads by semicircular clips 16 bolted to the bus bar heads.

Bus bar 7, 8 and 9 are supported or braced against each other by means of insulating materials 17 and 18, and are firmly interconnected by screws 19 and 20. With this arrangement, the six electrodes 1 and 2 can be moved as a single unit into mold 3, by a lifting and lowering device which has not been illustrated, and can be adjusted in height in accordance with the progress of the melting-down process.

Figure 5:
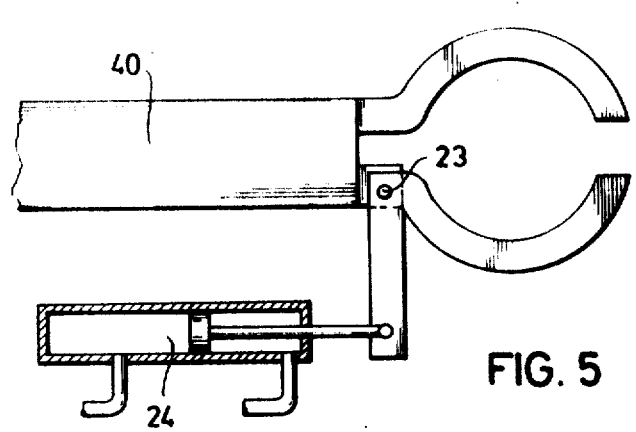
FIG. 5 is a partial top plan view, to an enlarged scale, of that portion of the apparatus, shown in FIG. 4, within the circle A.
Figure 4:
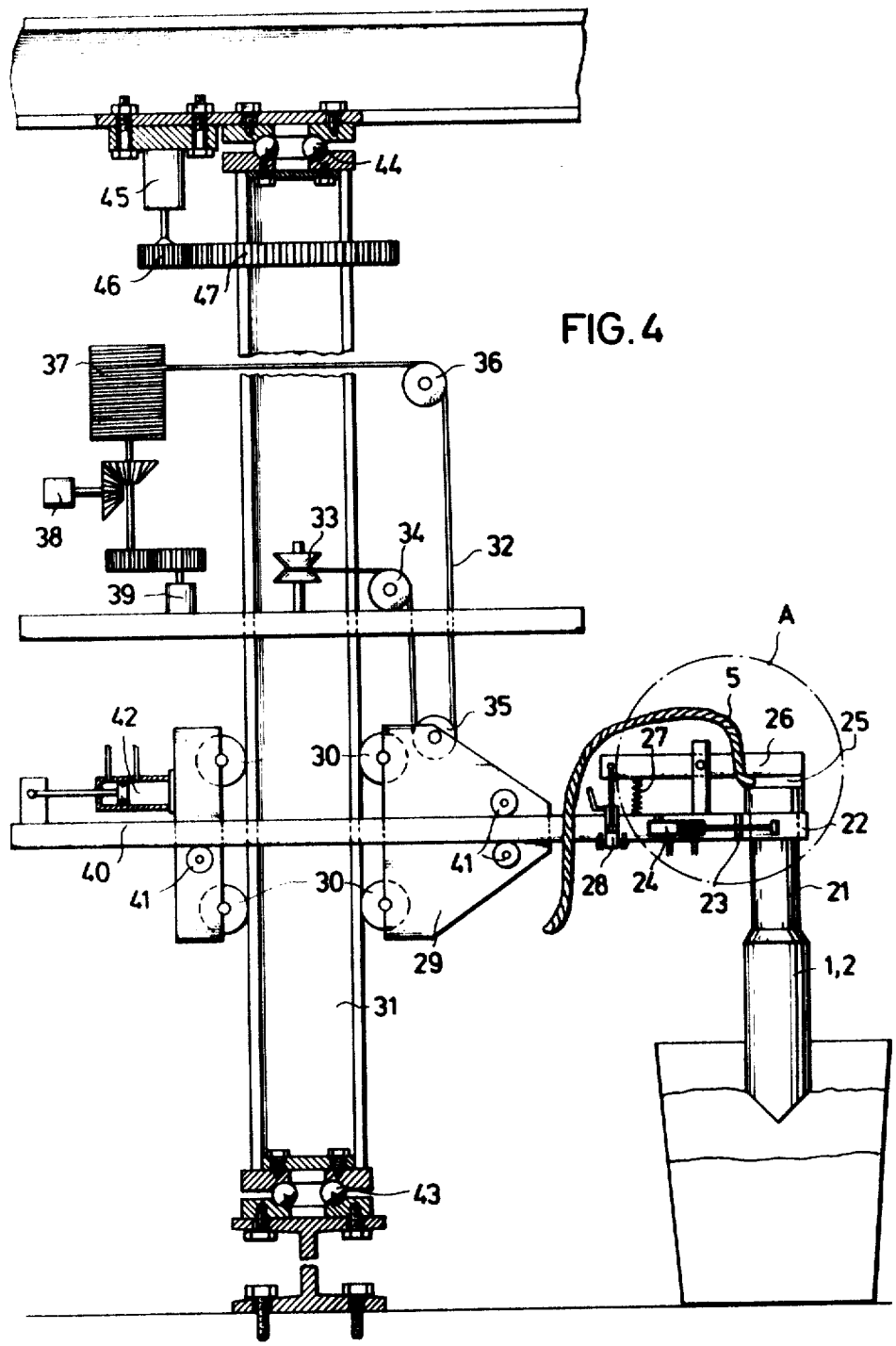
FIG. 4 is an elevation view, partly in section, illustrating another embodiment of the invention apparatus.

Referring now to FIGS. 4 and 5, in the embodiment of the invention shown therein, the electrode holders provide for moving electrodes 1 and 2 not only vertically but also radially and normal to vertical and radial movement. Each electrode 1 or 2 is held by a clamp 22 engaging an adapter piece secured to the head of the electrode. Clamp 22 is hinged at 23, and can be opened and closed about the axis of this hinge by a hydraulic actuator indicated at 24. A contact plate 25 is pressed by a lever 26, biased by a spring 27, against the upper end of adapter piece 21, and a hydraulic actuator 28 provides for disengaging contact plate 25 from adapter piece 21. Current is supplied through a cable 5 electrically connected to contact plate 25.

Movement of each electrode in a vertical direction is effected through the medium of a guide carriage 29 having guide rollers 30 which engage a guide column 31, of rectangular cross section, for movement of guide carriage 29 vertically along column 31. Driving is effected by a cable line 32 having one end secured to guide column 31 by a clamp 33, and its other end is secured to a cable-winding drum 37. Cable 32 is trained around pulleys or rolls 34, 35 and 36. Pulley or roll 35 is connected with guide carriage 29 to transmit the lifting force thereto. To regulate the depth of immersion of each electrode during the melting-down operation, raising and lowering is effected by means of a drive motor 38 connected by gearing to drum 37, while rapid introduction of the electrode into the mold and extraction of the electrode therefrom is effected by means of a drive motor 39 also connected by gearing to drum 37.

Displacement of an electrode radially of the mold is effected through the medium of a movable electrode arm 40 which is guided, for displacement in carriage 25, by means of rolls 41, and which is displaced by means of a hydraulic actuator 42. Arm 40 extends through a slot in guide column 31. Pivoting of each electrode 1 and 2 in a direction normal to the two directions of adjustment is effected by rotation of guide column 31, which is mounted in ball bearings 43 at its lower end and in ball bearings 44 at its upper end, pivoting being effected by a motor 45 through gears 46 and 47.

Figure 6:
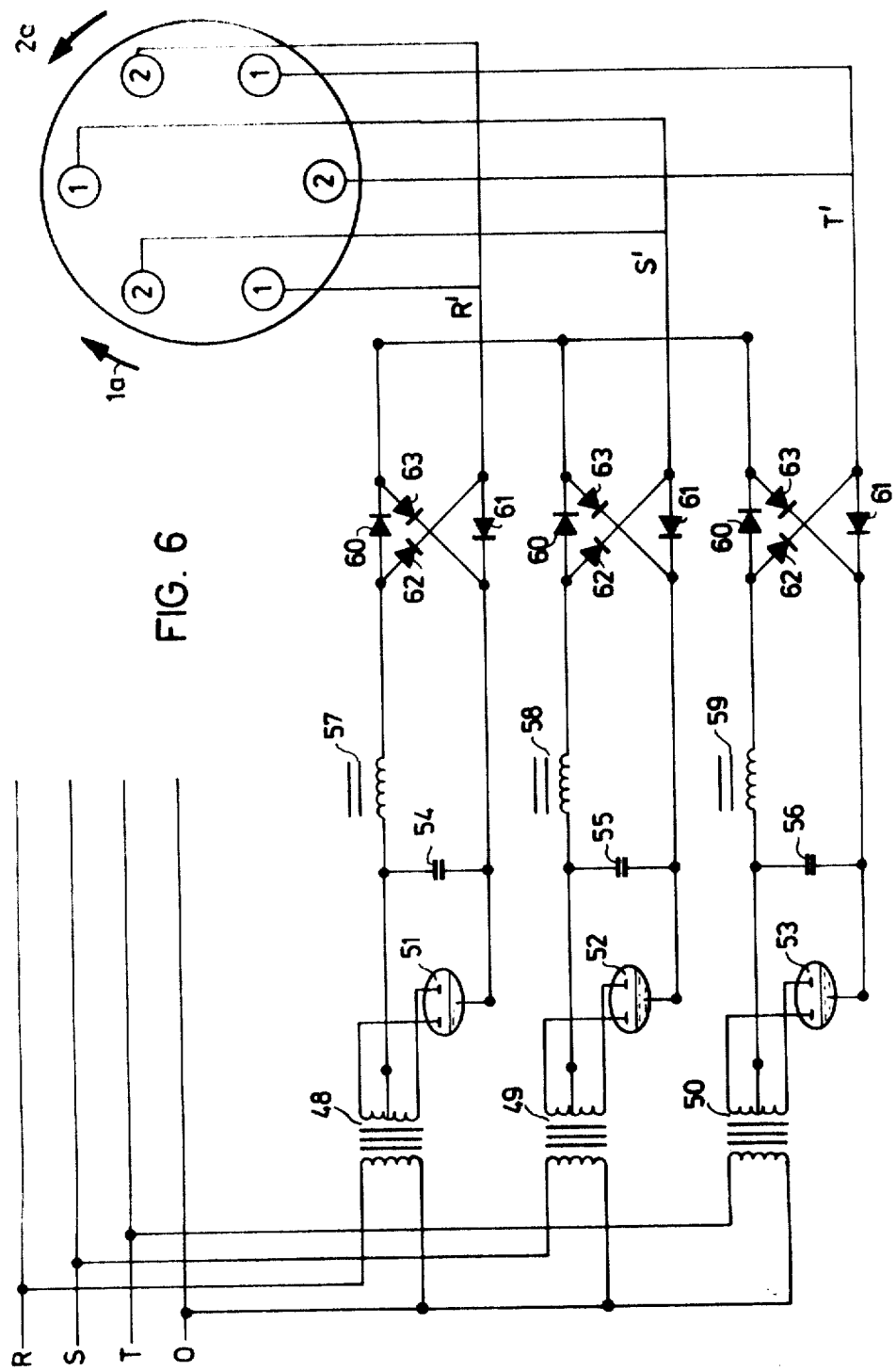
FIG. 6 is a schematic wiring diagram of the inverter systems.

To reduce induction losses, the operating current for the apparatus is supplied from a low frequency inverter system whose circuit arrangement is schematically illustrated in FIG. 6. The three phases, R, S and T, of a polyphase current network, are connected to respective transformers 48, 49 and 50 which reduce the high voltage of the network to the operating voltage of the remelting equipment, which is approximately 70 volts. Respective mercury vapor rectifiers 51, 52 and 53 are connected to the secondary or output windings of transformers 48, 49 and 50, and effect a full-wave rectification of the secondary voltage, with the secondary current being smoothed by means of respective condensers 54, 55 and 56 and respective inductances or chokes 57, 58 and 59.

Four Thyristors 62–63 are provided in association with each rectifier 51, 52 and 53 and, through control voltages applied thereto, transform the direct current into an alternating current having a low frequency of from 3 to 10 cycles. For this purpose, either Thyristors 60 and 61 are triggered conductive with Thyristors 62 and 63 remaining nonconductive or, for reversal of the current, Thyristors 60 and 61 are made nonconductive and Thyristors 62 and 63 are made conductive. The control voltages for the Thyristors are applied in such a manner that the three resulting AC voltages represented in the phases R', S' and T' have a phase displacement of 120° relatively to each other. The conductors R', S' and T' are connected with the electrodes 1 and 2 of the electroslag remelting unit in such a manner that the voltage vectors revolve in the direction of the arrow 1a (FIG. 1) or in the opposite direction 2a (FIG. 1).

The following example of the remelting of a high alloy ingot having a weight of 8 tons will be illustrative of the advantages of the invention. The steel grade of the ingot was X 10 Cr Ni Mo Ti 1,810. The steel of the ingot had the following analysis: C<0.07 percent, Si approximately 0.5 percent, Mn 1.2 percent, Cr 17.5 percent, Mo 2.3 percent, Ni 12.0 percent, Ti<0.7 percent, minimum 5 × percent C.

This ingot was remelted, using the method of the invention, with six electrodes each having a diameter of 200 mm. The mold diameter was 1,000 mm. The operating voltage was 50 volts, and the current intensity 8,000 A./phase. Under these operating conditions, the 8 ton ingot was remelted in approximately 800 minutes, with a very good result with respect to purity and uniform distribution of the elements over the cross section and length of the ingot. During remelting, the slag bath was perfectly at rest with respect to any rotational movement. Only the familiar convection current flow occurred. By contrast, when remelting in the same mold using three electrodes, each having a diameter of 300 mm. and each supplied with polyphase current at a current intensity of 9,500 A./phase, there occurred a rotational movement of approximately 2 r.p.m.

While specific embodiments of the invention have been shown and described in detail to illustrate the application of the principles of the invention, it will be understood that the invention may be embodied otherwise without departing from such principles.

What we claim is:

1. A method of electroslag remelting ingots, using plural electrodes connected to a source of polyphase alternating current, said method comprising the steps of connecting a set of $n$ first electrodes to a source of polyphase AC potential to provide a voltage vector rotating in a selected angular direction; connecting at least one set of $n$ second electrodes to a source of polyphase AC potential to provide a voltage vector rotating in an angular direction opposite to said selected direction; positioning said first and second electrodes in a mold with each electrode of one set located between a pair of electrodes of the other set; and energizing said electrodes to effect the electroslag remelting operation.

2. A method, as claimed in claim 1, in which said first and second electrodes are arranged in alternation on a common circle.

3. A method, as claimed in claim 1, in which each set of $n$ electrodes comprises three electrodes.

4. A method, as claimed in claim 1, in which each set of $n$ electrodes comprises three electrodes Y-connected to a source of polyphase alternating current with the junction point of the Y-connection being connected to said mold.

5. A method, as claimed in claim 1, in which said electrodes are energized at an alternating current frequency which is a minor fraction of the commercial mains frequency.

6. Apparatus for electroslag remelting ingots, using plural electrodes connected to a source of polyphase alternating current, by flexible conductors, and immersed in a slag bath covering an ingot in a mold, said apparatus comprising, in combination, polyphase current transformer means, a set of $n$ first electrodes connected to terminals of said polyphase current transformer means in a manner to provide a voltage vector rotating in a selected angular direction; and at least one set of $n$ second electrodes connected to said polyphase current transformer means in a manner to provide a voltage vector rotating in an angular direction opposite to said selected direction; said first and second electrodes being positioned in said mold with each electrode of one set located between a pair of electrodes of the other set.

7. Apparatus, as claimed in claim 6, in which there are three first electrodes and three second electrodes, said first and second electrodes being arranged in alternation on a common circle at substantially equal angular spacings from each other.

8. Apparatus, as claimed in claim 7, in which said polyphase current transformer means is a three-phase current transformer having three terminals; three parallel bus bars extending diametrically of said mold with the plane of symmetry of the central bus bar intersecting the center of said circle in a manner such that the electrodes are divided into three groups arranged in mirror symmetry relative to the plane of symmetry of said central bus bar; said flexible conductors each connecting a respective terminal of said current transformer to a respective bus bar immediately in advance of said mold; and means connecting each bus bar commonly to one first electrode and to one second electrode, the two electrodes connected to each bus bar being on respective opposite sides of said plane of symmetry; the connecting means connected to said central bus bar extending diametrically of said mold and the connecting means connected to the other two bus bars extending in spaced parallel relation to the connecting means connected to said central bus bar.

9. Apparatus, as claimed in claim 8, in which said flexible conductors are positioned closely adjacent each other and said bus bars being placed in substantial juxtaposition with the interposition of insulating material and firmly interconnected with each other; said connection means comprising shunt bus bars each rigidly connected with the respective electrodes; and raising and lowering means connected to said bus bars.

10. Apparatus, as claimed in claim 7, including individual electrode holders each respective to a different electrode; a vertically extending support for each electrode holder, extending parallel to the axis of said circle; means mounting each electrode holder on its support for adjustment vertically and radially thereof, with each support being arranged for angular adjustment about its axis for adjustment of the associated electrode perpendicular to the vertical and radial adjustment directions thereof; first driving means operable to adjust each holder on its support; second driving means operable to adjust each support angularly about its axis; a respective electrode holding clamp on each electrode holder operable to clamp the associated electrode; third driving means operable to open and close each clamp; a contact plate movably mounted on each electrode holder for engagement with the associated electrode and disengagement from the latter; and a respective current supply line connecting each contact plate to a terminal of said polyphase current transformer means.

11. Apparatus, as claimed in claim 10, in which said polyphase current transformer means comprises a low frequency inverter system having terminals Y-connected to said electrodes; and conductor means connecting a bottom plate of said mold to the neutral of said Y-connection.